Figure 9:
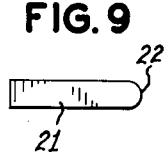

April 23, 1963  M. HOFER  3,087,043
METHOD OF MAKING SPINNERETTES
Filed June 23, 1960  2 Sheets-Sheet 1
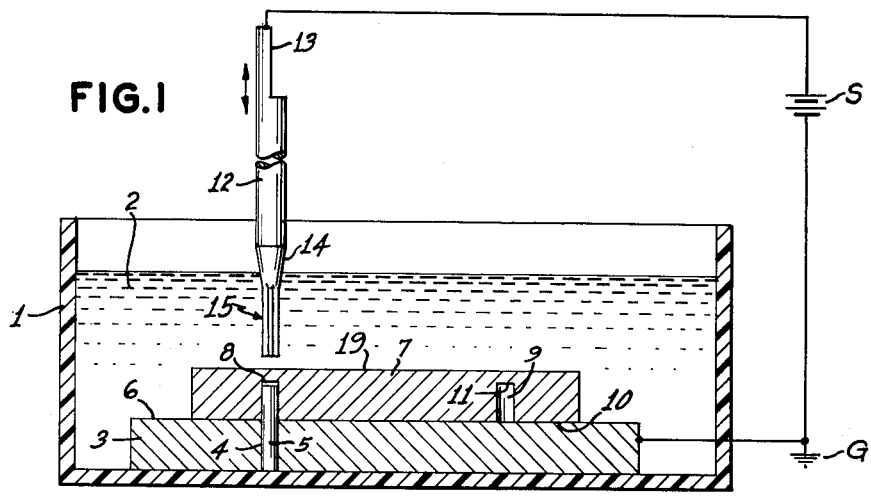
FIG. 1
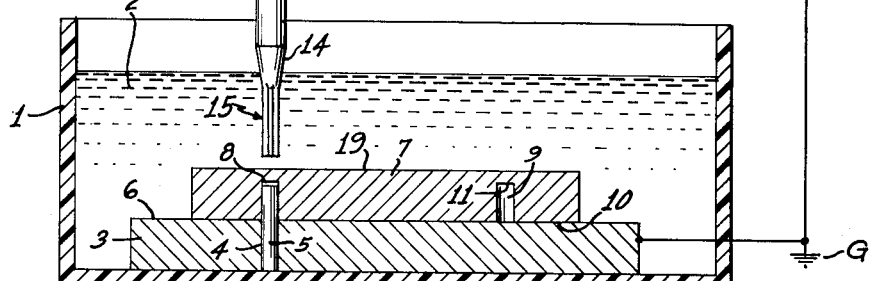
FIG. 2
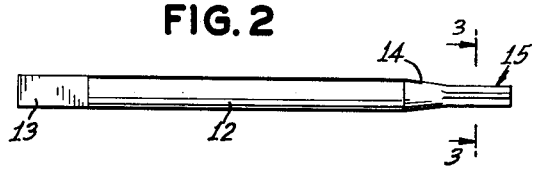
FIG. 3
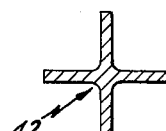
FIG. 4
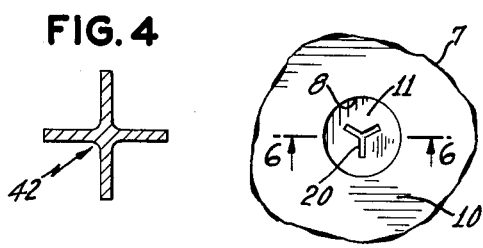
FIG. 5   FIG. 6
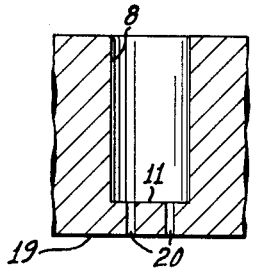
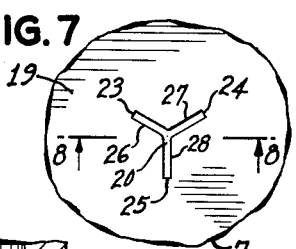
FIG. 7
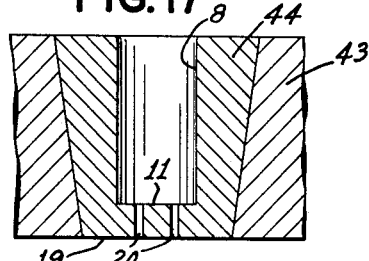
FIG. 17
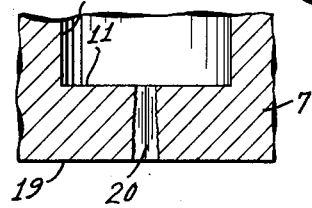
FIG. 8
INVENTOR.
MAX HOFER
BY
John G. Kovalich, Agent
Karl Huber
James E. Bryan
Glen C. Rose
ATTORNEYS April 23, 1963    M. HOFER    3,087,043
METHOD OF MAKING SPINNERETTES
Filed June 23, 1960    2 Sheets-Sheet 2

INVENTOR.
MAX HOFER
BY
ATTORNEYS

United States Patent Office 3,087,043
Patented Apr. 23, 1963

1

3,087,043
METHOD OF MAKING SPINNERETTES
Max Hofer, Basel, Switzerland, assignor to Engelhard Industries, Inc., Newark, N.J., a corporation of Delaware
Filed June 23, 1960, Ser. No. 38,236
5 Claims. (Cl. 219—69)

The present invention deals with a method of making spinnerettes and more particularly with a method of making spinnerettes having formed therethrough a plurality of spinning orifices each comprising a capillary of non-circular cross section terminating in the extrusion face of the spinnerette.

Spinnerette orifices must of necessity be capable of maintaining their precise dimensions and the orifice capillary walls must remain smooth during extended extrusion periods under high temperature or corrosive conditions. These conditions require the spinnerettes to be fabricated from a hard refractory material. In melt spinning processes, e.g., in the production of nylon filaments, the spinnerette plate is usually made from refractory base metal alloys, e.g., steel, and is of substantial thickness. It is difficult to form minute capillaries through such hard material with a desirable degree of uniformity among the plurality of orifice capillaries. The forming of minute capillaries through a refractory plate employed in the manufacture of spinnerettes of the melt spinning type is especially difficult when the minute capillaries are of non-circular cross section.

In accordance with this invention, it is possible to make uniform spinnerette orifices comprising capillaries of non-circular cross section by boring a plurality of holes partly through the thickness of a spinnerette plate, immersing the plate into a dielectric fluid, immersing an electrode tip of non-circular cross section into the fluid in coaxial alignment with the hole, applying an electrical potential between the plate and electrode tip, positioning the electrode tip relative to the plate sufficient to establish an arc therebetween, advancing the arc and thereby eroding the plate material until a non-circular capillary in substantial conformity with the shape of the electrode tip is formed therethrough in communication with the hole, repeating the operation to form a plurality of capillaries each communicating with a bored hole, removing the plate from the dielectric fluid, and broaching the eroded capillaries to a predetermined finish.

It is an object of the present invention to provide a spinnerette comprising an extrusion orifice having a non-circular capillary terminating in the extrusion face of the spinnerette.

It is another object of the invention to provide a method of producing spinnerette orifices through a refractory spinnerette plate, the orifice capillaries being of non-circular cross section.

It is a further object of the invention to provide a method of making spinnerettes by eroding an orifice capillary of non-circular cross section through a spinnerette plate.

Other objects and advantages of the invention will become apparent from the description hereinafter following and the drawings forming a part hereof, in which:

FIGURE 1 is a partly cross sectional and partly schematic view of the apparatus employed in the manufacture of spinnerettes according to the invention, FIGURE 2 is a side elevational view of an electrode employed in the method of the invention, FIGURE 3 is an enlarged cross sectional view of the electrode along lines 3—3 of FIGURE 2, FIGURE 4 is a cross sectional view of a modified electrode tip, FIGURE 5 is an enlarged fragmentary top view of a spinnerette plate having an orifice formed therethrough according to the method of the invention, FIGURE 6 is a cross sectional view along lines 6—6 of FIGURE 5, FIGURE 7 is an enlarged fragmentary view of the extrusion face of the spinnerette.

Figure 10:
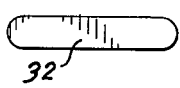
Figure 11:
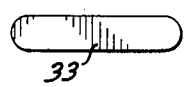
Figure 12:
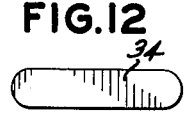
Figure 14:
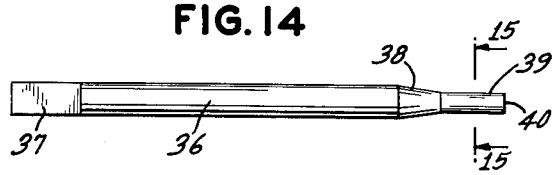
Figure 13:
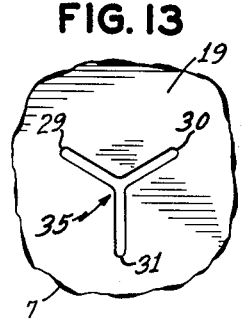
Figure 15:
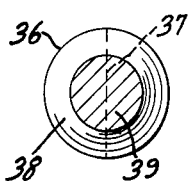
Figure 16:
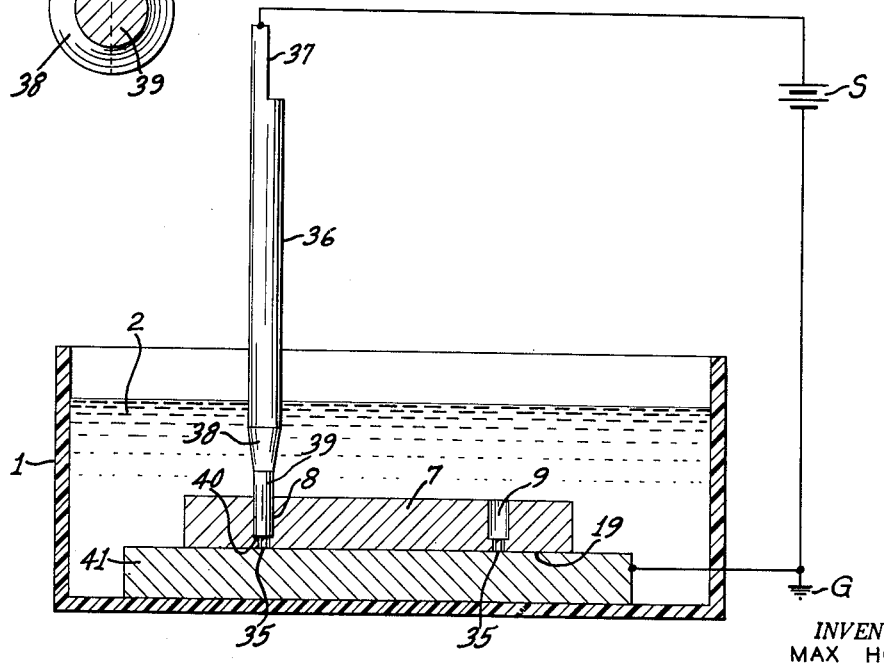

FIGURE 8 is an enlarged cross sectional view along lines 8—8 of FIGURE 7,

FIGURE 9 is an end view of a first elongated broach employed in practicing the method of the invention, FIGURE 10 is an end view of a second elongated broach employed in practicing the method of the invention, FIGURE 11 is an end view of a third elongated broach employed in practicing the method of the invention, FIGURE 12 is an end view of a fourth elongated broach employed in practicing the method of the invention, FIGURE 13 is an enlarged fragmentary view of the finished extrusion face of a spinnerette, FIGURE 14 is a side elevational view of a deburring electrode employed in practicing the method of the invention, FIGURE 15 is a cross sectional view along lines 15—15 of FIGURE 14, FIGURE 16 is a partly cross sectional and partly schematic view of the apparatus employed in the method of the invention, and FIGURE 17 illustrates a cross sectional view of a modified form of spinnerette.

In accordance with the invention, there is provided a tank 1 composed of a dielectric material, e.g., glass or plastic, which contains a dielectric fluid 2, e.g., kerosene. An electrically conductive plate 3 is positioned in the tank 1 and submerged in the dielectric fluid. The plate is provided with a bore 4 formed completely or partly therethrough and with a solid or hollow guide pin 5 mounted in the cavity and extending outwardly of the face 6 of the plate 3. A metallic spinnerette plate 7 having a plurality of blind flat-bottomed bores 8 and 9 formed partly therethrough through the inlet face 10 thereof is mounted on the conductive plate 3 and submerged in the fluid 2 with the pin 5 engaging one of the bores 8. The bores 8 and 9 are preformed prior to the positioning of the spinnerette plate 7 in tank 1 by conventional boring means and terminates in a flat bottom 11. When the inlet face 10 of spinnerette plate 7 is positioned in contact with the plate 3 the end of the guide pin is preferably spaced from the bore bottom 11. Having mounted the bored spinnerette plate 7 in the fluid 2, an electrode 12 is directed into the fluid 2 in coaxial alignment with one of the bores, e.g., bore 8. The electrode 12, as illustrated by FIGURES 1, 2, and 3, comprises an elongated cylindrical body having at one end a flat faced portion 13 adapted to mate a chuck element for appropriate mounting of the electrode in the chuck (not shown), which chuck in turn comprises a component of a suitable electrode feeding apparatus. The other end portion of the electrode is tapered, as at 14, with an electrode tip extending from the tapered portion coaxially of the electrode. The tip 15 is of non-circular cross section, e.g., substantially in the form of a Y having legs 16, 17, and 18 of equal length extending radially of the axis thereof. Preferably, the electrode tip 15 has a length slightly in excess of the thickness of the spinnerette plate between the extrusion face 19 and the bore bottom 11. However, under certain conditions, electrode tips having substantially longer tips may be employed.

The electrode 12 and conductive plate 3 are electrically connected to a source of voltage S, the plate 3 being effectively connected to ground G, and the spinnerette plate 7 is in electrical contact with plate 3, whereby there is provided an electrical potential between the electrode tip 15 and spinnerette plate 7. Having energized the electrode, the electrode tip is advanced toward plate 7 in alignment with hole 8 until an arc is established between the plate 7 and electrode tip 15. Having established the arc it is controllably advanced and thereby erodes the spinnerette plate material until a non-circular capillary 20 in substantial conformity with the shape of the electrode tip is formed therethrough in communication with hole 8. The nature of the eroded capillary 20 formed by the electrode of FIGURES 2 and 3 is illustrated by FIGURES 5, 6, 7 and 8. The term "substantial conformity" as applied to the eroded capillary 20 refers to the fact that while the capillary and electrode tip are of similar cross sectional configuration, there is a difference in cross sectional dimensions. The capillary cross section is always greater than that of the electrode. For example, with an electrode tip of FIGURE 3 having legs 16, 17 and 18 each about 65 microns in width, the corresponding portions of the eroded capillary 20 will have a width of about 100 microns. Furthermore, while the sides of the legs 16, 17 and 18 are parallel with respect to each other, the corresponding sides of the eroded capillary exhibit slight convergence at least for a portion of their lengths from the extrusion face 19 toward the hole bottom 11. This is shown by FIGURE 8 which also shows the capillary walls as having substantial roughness.

Having eroded a capillary through the spinnerette plate in communication with the base 8 as described above, the plate 7 is turned with the pin 5 engaging another identical bore 9 and the process is repeated. The eroded spinnerette plate is removed from the dielectric fluid. At this stage the spinnerette is unsuited and undesirable for spinning process because of the irregularity and roughness of the capillary walls. Not only are the capillaries rough and irregular, but there is substantial undesirable non-uniformity among the plurality of eroded capillaries.

In order to finish the capillary walls and render the spinnerette suitable for spinning, a first broach 21 having an arcuate longitudinal edge 22, as illustrated by FIGURE 9, is mounted in a suitable broaching apparatus and the broach is directed through the capillary 20 with the arcuate edge 22 broaching the terminal ends 23, 24 and 25 of capillary portions 26, 27 and 28, respectively, as indicated by FIGURE 7 to provide the rounded terminals 29, 30, and 31 of FIGURE 13. Thereafter, second, third and fourth broaches 32, 33 and 34, as illustrated by FIGURES 10, 11 and 12, and each having an increased width with respect to the other, in respective order, are sequentially applied through each of the capillary portions 26, 27 and 28 to broach the sides thereof to desirable smoothness and dimensions and to provide the capillary cross sectional configuration illustrated by capillary 35 of FIGURE 13.

Having finished the capillary walls by the above broaching, there is a presence of an undesirable burr formation on the flat bottom 11 of bore holes 7 and 8 surrounding the capillary inlets, the burr formation being created by the broaching. In accordance with the invention, such burr formation is advantageously removed by an arc erosion process. In effecting the deburring of the flat bottom 11 of the bore holes 8 and 9, a deburring electrode 36 illustrated by FIGURES 14 and 15, is employed. The electrode comprises a chuck-engaging flat surface 37 at one end portion thereof, a tapered portion 38 near another end thereof and with a cylindrical electrode tip 39 extending from the tapered portion coaxially of the electrode. The electrode tip 39 is insertable into the bore holes 8 and 9 and is provided with a flat end 40 having a cross sectional area greater than an imaginary circle encompassing the inlet of capillary 35 in the flat bottom 11 of bore holes 8 and 9. In accordance with FIGURE 16, a conductive plate 41 is positioned in the tank 1 and submerged in dielectric fluid 2. The broached spinnerette is submerged in fluid 2 and mounted on the plate 41 with the extrusion face 19 contacting the flat surface of the plate 41. The electrode 36 is mounted in a chuck in the manner described with respect to FIGURE 1 and is similarly energized. The electrode is advanced into the bore hole until an arc is established between the bottom 11 and the electrode, and the arc is advanced a predetermined distance sufficient to deburr the bottom by erosion. The process is repeated for the plurality of orifices and the finished spinnerette is removed from the dielectric fluid.

FIGURE 4 illustrates a modification of the invention in that the non-circular capillary may be formed in a cruciform shape by means of an electrode having a tip 42 of cruciform cross section in substitution for the electrode of FIGURES 2 and 3.

While the spinnerette plate may be composed of a refractory metal such as steel, it may also be composed of tungsten carbide, tantalum carbide, or precious metal alloys. Also, the bore holes may be eliminated or substituted by other recesses having hyperbolic, parabolic or conical walls.

FIGURE 17 represents still another modification in that a spinnerette plate 43 may be composed of one metal provided with an insert member 44 of another metal having the orifice formed therethrough by the method of the invention. For example, the plate 43 may be composed of steel and the insert may be composed of tungsten carbide.

The following example further describes the invention.

*Example I*

A steel spinnerette plate having a diameter of 3.5 inches and a thickness of 0.312 inch was provided with a plurality of bore holes formed partly therethrough and each having a length of 0.272 inch and a diameter of 0.093 inch. The bottoms of the holes were flat. The plate was mounted in apparatus as described in accordance with FIGURE 1. An electrode according to FIGURES 2 and 3 was mounted above the spinnerette plate as described. The electrode had a total length of 67 mm. and a diameter of 3.5 mm. The conical or tapered portion had a length of 5 mm. The legs of the electrode forming a Y-shape each had a thickness of 0.065 mm. and a length of 0.773 mm. The electrode was energized and advanced into the plate through the extrusion face in alignment with the bore. The capillary formed by erosion was in the form of the electrode tip and 0.040 inch in length. Each capillary slot formed by the electrode tip legs had a length of 0.790 mm. and a width of 0.100 mm. The process was repeated to provide eroded capillaries communicating with each of the bores.

The eroded spinnerette plate was removed from the dielectric fluid and mounted for broaching. In broaching, a first broach having a width of 0.787 mm. and a thickness of 0.100 mm. and a rounded edge was advanced into one of the capillary slots through the extrusion face. The rounded edge of the first broach made about a 5 micron cut in the extremity of the capillary slot. The process was repeated until the slit had a length of 0.820 mm. The process was repeated for each of the Y-shaped slots. Subsequently, a second rounded edged broach having a width of 0.820 mm. and a thickness of 0.105 mm. was advanced through the slot to broach the slot sides with a 5 micron increase in width. A third rounded edged broach having a width of 0.820 mm. and a thickness of 0.110 mm. was advanced through the slot to broach the slot sides with a 5 micron increase in width. A fourth rounded edge broach having a length of 0.820 mm. and a thickness of 0.114 mm. was similarly advanced to provide the final slot dimensions. The process was repeated for the other slots of the capillary. All the spinnerette capillaries were broached in this manner. The broaching operations created a burr formation at the perimeter of the Y-shaped capillaries on the surface of the flat bottoms of the bores. Following the broaching, the spinnerette was again immersed in the dielectric fluid as described with respect to FIGURE 16. A deburring electrode according to FIGURES 14 and 15 was substituted for the electrode of FIGURES 2 and 3. The deburring electrode had a length of 67 mm. and a diameter of 3.5 mm. The conical or tapered portion of this electrode had a length of 5 mm. The cylindrical tip of the electrode had a length of 0.350 inch and a diameter of 0.080 inch. The deburring electrode was advanced into a bore hole, as illustrated by FIGURE 16, until an arc was established, and the arc was advanced a predetermined distance sufficient to deburr the bottom of the bore hole by erosion. The process was repeated until all bore hole bottoms were deburred and the finished spinnerette was removed from the dielectric fluid.

While the description hereinabove is specific in relation to the structure illustrated by the drawings, various modifications are contemplated within the scope of the appended claims.

What is claimed is:

1. The method of making a spinnerette comprising forming a recess in one face of a plate, immersing the plate into a dielectric fluid, immersing an electrode tip of solid non-circular cross section into the fluid adjacent the opposite face of the plate in coaxial alignment with the recess, applying an electrical potential between the plate and electrode tip, positioning the electrode tip relative to the plate sufficient to establish an arc therebetween, advancing the arc and thereby eroding the plate material until a non-circular capillary in substantial conformity with the electrode tip is formed therethrough through said opposite face and in communication with the recess, removing the plate from the dielectric fluid, and broaching the eroded capillary to predetermined finish.

2. The method of making a spinnerette comprising forming a flat bottomed hole partly through the thickness of a plate through one face thereof, immersing the plate into a dielectric fluid, immersing an electrode tip of solid non-circular cross section into the fluid adjacent the opposite face of the plate in coaxial alignment with the hole, applying an electrical potential between the plate and electrode tip, positioning the electrode tip relative to the plate sufficient to establish an arc therebetween, advancing the arc and thereby eroding the plate material until a non-circular capillary in substantial conformity with the electrode tip is formed therethrough through said opposite face in communication with the hole, removing the plate from the dielectric fluid, broaching the eroded capillary through said opposite face to predetermined finish, immersing the broached plate into a dielectric fluid, immersing an electrode tip into the fluid into and in coaxial alignment with the hole, applying an electrical potential between the plate and electrode tip, positioning the electrode tip relative to the bottom of the hole sufficient to establish an arc therebetween, and advancing the arc sufficiently to deburr the plate material about the capillary.

3. The method of making a spinnerette according to claim 2, comprising positioning the electrode into the hole sufficiently to establish an arc between the flat bottom of the hole and the electrode, and advancing the arc sufficiently to deburr the flat bottom.

4. The method of making a spinnerette according to claim 1, wherein the non-circular capillary is of Y-shaped cross section.

5. The method of making a spinnerette according to claim 1, wherein the non-circular capillary is of cruciform cross section.

References Cited in the file of this patent

UNITED STATES PATENTS

| | | |
|---|---|---|
| 2,427,588 | Burnett | Sept. 16, 1947 |
| 2,650,979 | Teubner | Sept. 1, 1953 |
| 2,800,566 | Matulaitis | July 23, 1957 |